United States Patent [19]

Butterworth

[11] 4,012,995

[45] Mar. 22, 1977

[54] ASSEMBLIES WHICH COMPRISE AXIALLY SLIDABLE PISTONS/SPOOLS

[75] Inventor: Philip Butterworth, Cockermouth, England

[73] Assignee: Butterworth Hydraulic Developments Limited, London, England

[22] Filed: Apr. 30, 1975

[21] Appl. No.: 573,047

[30] Foreign Application Priority Data

May 6, 1974 United Kingdom ............ 19749/74

[52] U.S. Cl. .................................. 92/152; 92/171; 92/153

[51] Int. Cl.² .......................................... F16J 11/04

[58] Field of Search ..................... 92/152, 167, 171

[56] References Cited
UNITED STATES PATENTS

| | | | |
|---|---|---|---|
| 1,245,643 | 11/1917 | Planck | 92/152 |
| 2,282,254 | 5/1942 | Shimer | 92/171 |
| 2,282,502 | 5/1942 | Suth | 92/171 |
| 2,345,370 | 3/1944 | Whann et al. | 92/171 |
| 2,981,575 | 4/1961 | Leman | 92/171 |
| 3,510,233 | 5/1970 | Strebel et al. | 92/171 |

Primary Examiner—Paul E. Maslousky
Attorney, Agent, or Firm—McCormick, Paulding & Huber

[57] ABSTRACT

In a piston and cylinder assembly the cylinder comprises at least one annular cylinder block received in a complementary bore of a housing. A means for axially retaining the cylinder block in place relative to the housing includes a pair of slidably engaging part spherical surfaces one of which is carried by a radially displaceable member to adjust for misalignment between the cylinder block and an associated retaining component and to thereby alleviate axially offset pressure which might otherwise be applied to the cylinder block.

2 Claims, 1 Drawing Figure

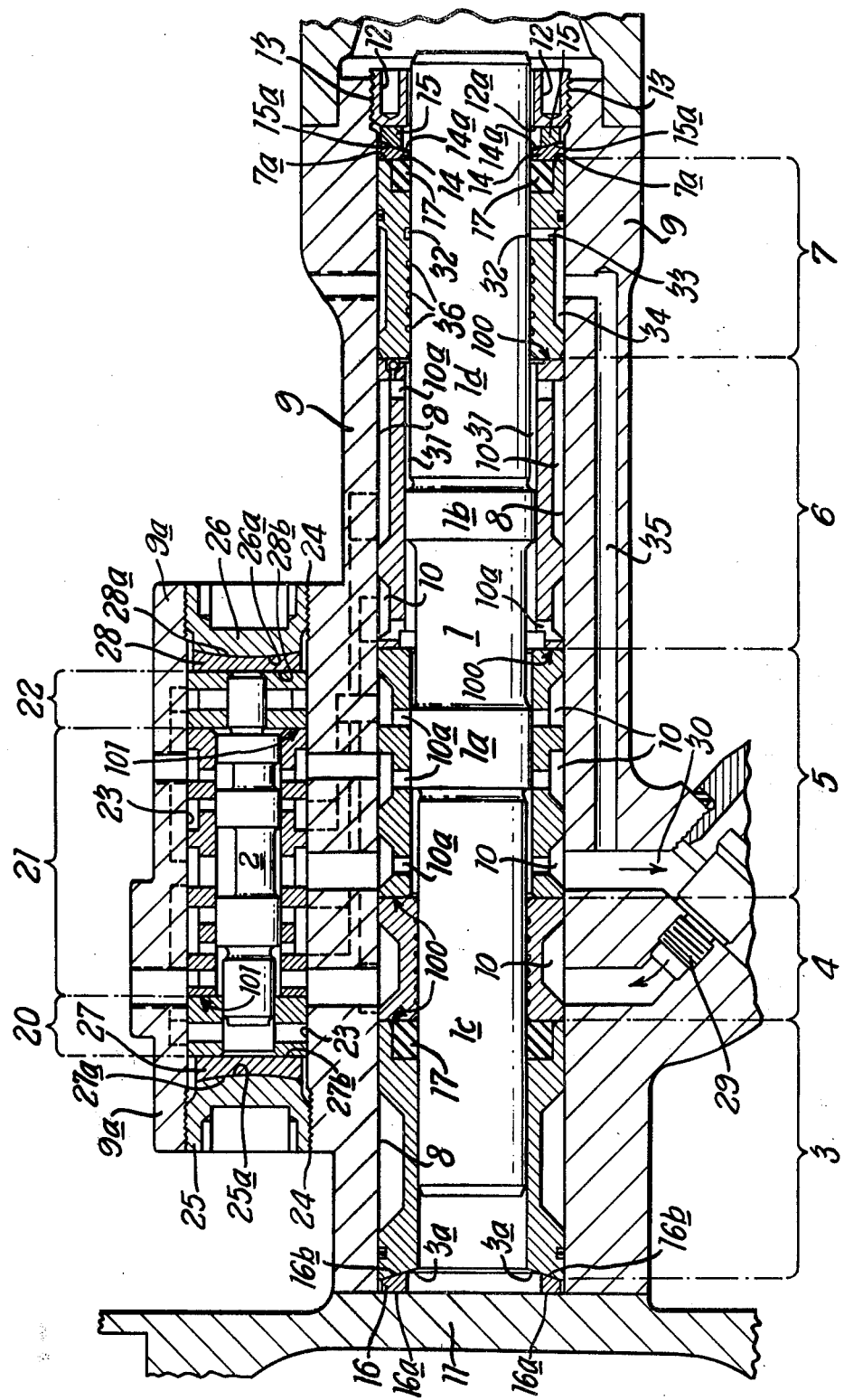

ASSEMBLIES WHICH COMPRISE AXIALLY SLIDABLE PISTONS/SPOOLS

This invention relates to an assembly which comprises a piston or spool slidable in a cylinder and is particularly concerned with an improved construction for the cylinder which will facilitate manufacture of the assembly.

Usually the assembly will be in the form of a fluid pressure operated device or fluid pressure control device, for example a piston and cylinder arrangement may form part of an hydraulic motor or a spool and cylinder arrangement may form part of a valve for control of hydraulic fluid, and for convenience the term "piston" as mentioned hereinafter will be used to refer either to a piston proper or to a spool.

According to the present invention there is provided an assembly which comprises a piston slidable in a piston cylinder, in which the piston cylinder is at least partly defined by a substantially annular piston cylinder block which is received axially within a substantially complementary cylindrical bore of a housing of the assembly, the cylinder block being retained in the bore of the housing at at least one end thereof by a retaining component from which axial pressure is applied on the cylinder block through substantially complementary slidably engaging part spherical surfaces which are substantially co-axial with the bore, at least one of the part spherical surfaces being carried by a member disposed axially between the retaining component and the cylinder block which member is capable of radial displacement relative to the axis of the bore to accommodate for slight axial misalignment between the retaining component and the cylinder block and alleviate axially offset pressure which may otherwise be applied from the retaining component to the cylinder block.

Preferably, but not essentially, the retaining component (or one such component when two are provided at opposite ends of the cylinder block) is screw threaded to the housing and is substantially co-axial with the bore.

Usually the piston will be slidable axially in the piston cylinder and will hereinafter be considered as such; it is to be realised however that the present invention may be applied to the construction of a cylinder in which the piston is only intended to exhibit rotational sliding movement as, for example, in the manufacture of a rotational spool valve.

The piston cylinder may be constructed from two or more cylinder blocks which are received within the bore of the housing as an axially extending array with radially extending end faces of adjacent blocks in substantially face-to-face abutment, these blocks are then retained in the bore by the retaining component. Such a piece-meal construction of the piston cylinder is advantageous since it facilitates accurate machining of the piston cylinder part lengths in the respective blocks.

Having this latter feature in mind, if a piston cylinder is to be formed having a bore which reduces in a series of steps progressively along its axis, in the production of such a stepped bore piston cylinder as an integral unit by conventional techniques it may be found that the accuracy of the bore cannot be maintained due to machining difficulties over long axial lengths. In addition, the internal shoulders formed in the stepped bore between part lengths thereof of different diameters may not be machined initially at right angles (that is the angles formed at the corners between the cylindrical bore faces and the radial step-down faces) and in fact will likely be machined as radiussed faces — the effect of which may be to reduce to permissible axial stroke of the piston; admittedly right angled junctions can be machined at the internal corners formed between the cylindrical bore part length and the adjacent radial forces but this usually requires a subsequent machining operation and can thereof add considerably to the cost of production. By the piece-meal construction of the piston cylinder of the present invention the aforementioned disadvantages associated with conventionally formed integral piston cylinders having stepped bores may be alleviated by having separate piston cylinder blocks for cylinder part lengths of different bore diameters. It will be appreciated however that a piston cylinder block may be provided with a stepped bore, especially in cases where the axial length of the block is short.

The piece-meal construction of the piston cylinder in accordance with the present invention is also advantageous in so far as it permits piston cylinder constructions for assemblies in which a piston cylinder part length of relatively large diameter is disposed axially between two piston cylinder part lengths of relatively smaller diameters. It is an essential feature of the present invention that the cylinder block or blocks are retained in the bore of the housing by a retaining component which applies axial pressure on the block or blocks through the complementary and slidably engaging part spherical surface, one of which part spherical surfaces is carried on a radially displaceable member. As a result of machining tolerances in the manufacture of the housing, particularly in the formation of the bore and, for example, screw threads which may receive the retaining component, it may be found that the retaining component is not screw adjustable on the housing in exact axial alignment with the bore of the housing and consequently the axial direction of screwed movement of the retaining component may be out of parallel, admittedly to a very slight extent, with the axis of the bore in the housing. The effect of this slight misalignment is that if the part spherical surfaces are omitted and, say, the retaining component acts directly on the, or an end, cylinder block, and offset axial loading may be applied from the retaining component to the cylinder block or blocks which could provide radial forces which tilt the cylinder block or blocks or otherwise distort the piston cylinder sufficiently to impair axial sliding movement of the piston. By the present invention the aforementioned misalignment can be accommodated by relative sliding movement between the engaging part spherical surfaces and radial displacement of the or a member which carries one of those surfaces so that the pressure loading from screwed movement of the retaining member is transmitted substantially symmetrically to the cylinder block or blocks in directions parallel to the axis of the bore in the housing and with negligible radially directed forces.

One of the part spherical surfaces can be located on an end face of either the retaining component or the (or an end) cylinder block while the other part spherical surface is located on a radially displaceable member which is disposed axially between the retaining component and the adjacent cylinder block. Alternatively the two part spherical surfaces can be located one on each of two axially adjacent members which are disposed axially between the retaining component and the adjacent cylinder block, at least one of the said two adjacent members being capable of radial displacement relative to the axis of the housing bore.

If required the part spherical surfaces, the members which carry them, and also the retaining component can be of annular form through which the piston is axially movable during its stroke. The retaining component may be in the form of an externally screw threaded plug received within an internally screw threaded part of the housing, such part conveniently being an extension of the bore in the housing. Alternatively the retaining component may be in the form of an internally screw threaded cap which is received on an externally screw threaded part of the housing, the cap conveniently having a portion which is received axially within the bore of the housing.

One embodiment of a fluid pressure operated motor having two piston and cylinder assemblies constructed in accordance with the present invention will now be described, by way of example only, with reference to the accompanying illustrative drawing which shows the motor in section taken axially through the assemblies.

The fluid pressure operated motor illustrated comprises a power piston 1 and a valve piston 2 which are axially slidable for predetermined strokes in respective piston cylinders. The piston 1 has axially spaced lands 1a and 1b and axially extending end rods 1c and 1d. The cylinder within which the piston 1 is slidable is formed by an axially extending array of five annular cylinder blocks 3 to 7 which are received within a bore 8 of a housing 9. The blocks 3 to 7 are a close sliding fit in the bore 8 and are co-axial therewith. The interfaces between each pair of adjacent blocks are machined to lie in planes which extend radially of the axis of the bore 8 so that the end faces of adjacent blocks are in substantially face-to-face abutment (as indicated at 100). The blocks 3 to 7 are machined prior to their insertion in the bore 8 to provide the appropriate internal diameter within which the piston 1 is slidable. It will be noted that the piston lands 1a and 1b are of larger diameter than the piston rods and the aforementioned piece-meal construction of the piston cylinder by the blocks 3 to 7 enables assembly of the cylinder over the piston 1. Where necessary the blocks 3 to 7 are provided with passages and ports 10a which may be controlled by lands on the piston 1 to permit the flow of fluid to and from chambers formed between the piston 1 and its cylinder. The arrangement of these ports and passages will depend upon the fluid system employed in the motor but will not be discussed herein since the fluid flow arrangements are not directly relevant to the invention. However it is to be noted that in each instance where the cylinder blocks 3 to 7 have ports which communicate through the walls of the cylinder blocks to the piston cylinder, these ports are arranged to communicate with annular recesses or rebates 10 in the external cylindrical surface of the blocks. These annular recesses 10 provide a convenient means of alleviating localised radial forces from acting on the cylinder blocks as a result of fluid pressure flowing through the ports and passages.

The cylinder blocks 3 to 7 are retained in the bore 8 between a non-adjustable retaining component in the form of an end plate 11 secured to the housing 9 and an adjustable retaining component in the form of an annular plug 12. The plug 12 is substantially co-axial with the bore 8 and has an external screw thread by which it engages at 13 with an internal screw thread provided in the housing 9 on an axial extension of the bore 8. The end face 7a of the block 7 adjacent to the plug 12 is machined to lie in a radial plane of the bore 8 as, substantially, is the end face 12a of the plug and disposed axially between these two end faces 7a and 12a are two annular ring members 14 and 15. The ring member 14 is a close sliding fit within the bore 8 and abuts in face-to-face contact with the end face 7a while the ring member 15 has an external diameter slightly less than that of the bore 8 to provide a clearance therewith and abuts in face-to-face contact with the face 12a. The two ring members 14 and 15 have complementary slidably engaging part spherical surfaces 14a and 15a respectively. In the present embodiment the surface 14a is concave while the surface 15a is convex and both these surfaces are substantially co-axial with the bore 8. It will be apparent that as the plug 12 is screwed into the housing 9, axial pressure is applied through the abutting part spherical surfaces of the ring members 14 and 15 to cylinder blocks 3 to 7 to urge these blocks into abutment against the restraining effect of the closure plate 11. Provided between the closure plate 11 and adjacent end face 3a of the cylinder block 3 is a further annular ring member 16 having a face 16a which lies substantially in a radial plane and abuts the plate 11 in face-to-face contact and a convex part spherical surface 16b which slidably engages with the surface 3a while the latter is of substantially complementary part spherical shape to the surface 16b. The ring member 16 is located within the bore 8 and has an external diameter slightly less than that of the bore 8 to provide a clearance therewith.

During machining of the internal screw threads on the housing 9 which engage with the plug 12 and the bore 8 it is possible that the axis along which the plug 12 is displaced during its screwed movement is slightly out of alignment (that is to say not parallel with) the axis of the bore 8. As a consequence if the plug 12 is so arranged to abut directly the surface 7a, axially offset pressure may be applied to the blocks 3 to 7. which can cause the latter to be distorted sufficiently to inhibit free sliding movement of the piston 1 within its cylinder. The ring members 14, 15 and 16 are primarily concerned with alleviating the possiblity of axially offset forces being applied to the cylinder blocks 3 to 7 during tightening of the plug 12. This is achieved by the capability of the ring member 15 to slide radially over the ring member 14 to accommodate for slight axial misalignment between the plug 12 and bore 8 while ensuring that pressure is transmitted to the cylinder blocks through the part spherical surfaces 14a and 15a substantially wholly along the axis of the bore 8 and substantially symmetrically about that axis. A similar effect is achieved by the radially displaceable characteristics of the ring member 16 which permits this ring member to slide over the part spherical surface 3a to accommodate for slight inaccuracies in the machining or positioning of the plate 11 (or machining of the adjacent end face of the housing 9) which would result in the inner surface of that plate not being located in a radial plane of the bore 8.

It will be noted that the plug 13 and ring members 14 and 15 are annular to permit passage through them by the piston rod 1d during stroke of the piston. Further, the ring member 14 provides a convenient means of retaining an annular sealing ring 17 for the piston rod 1d in a rebate in the end surface 7a of the cylinder block 7.

The cylinder within which the piston 2 is axially slidable comprises three annular cylinder blocks 20, 21 and 22 which are received within a bore 23 of a housing extension 9a. The cylinder blocks 20 to 22 are a close sliding fit within and are co-axial with the bore 23 in a similar manner to the formation of the cylinder for the piston 1. These cylinder blocks 20 to 22 are machined prior to their insertion into the bore 23 to have end faces which lie in radial planes of the bore 23 and appropriately positioned ports, passages and external annular circumferential recesses to permit fluid flow in accordance with the particular configuration of the valve.

The cylinder blocks 20 to 22 are retained in the bore 23 by two retaining components in the form of external screw threaded plugs 25 and 26 which engage at 24 with complementary internal screw threads at each end of the bore 23. The plugs 25 and 26 have internal convex surfaces 25a and 26a respectively which are part spherical and substantially co-axial with the bore 23. These parts spherical surfaces slidably engage with substantially complementary part spherical surfaces 27a and 28a of disc members 27 and 28 respectively. The disc member 27 has a face 27b which lies in a radial plane of the bore 23 and abuts the end face of cylinder block 20 in substantially face-to-face manner while the disc member 28 has a face 28b which also lies in a radial plane of the bore 23 and abuts the end face of the cylinder block 22 in substantially face-to-face manner. Both disc members 27 and 28 have an external diameter slightly less than the bore 23 within which they are positioned to provide clearances with the bore. On assembly of the cylinder for the piston 2, the plugs 25 and 26 are screwed into the housing extension 9a thereby applying axial pressure through the disc members 27 and 28 to urge the radial end faces of the adjacent cylinder blocks 20 to 22 into abutment (as indicated at 101). In the event that the axis of screw threaded movement of either or both plugs 25 and 26 is not parallel with the axis of the bore 23 and to alleviate the possibility of axially offset pressures being applies to said cylinder blocks (which could distort or tilt them within the bore to an extent which impairs sliding movement of the piston 2), then either or both disc members 27 and 28 can be displaced radially relative to the surfaces 25a and 26a to an extent which ensures that the pressure from the plugs is transmitted to the cylinder blocks 20 to 22 substantially wholly along the axis of the bore 23 and substantially symmetrically about that axis.

Both surfaces 25a and 26a are closed since stroke of the piston 2 is retained axially between these surfaces.

It will be seen from the drawing that the annular regions 100 of face-to-face abutment between the cylinder blocks 3 to 7 and also the regions of abutment between the appropriate cylinder blocks and the ring members 14 to 16 (or at least substantial parts of these regions) are all in alignment parallel to the axis of the respective cylinder. Such alignment between the abutting surfaces is preferred to alleviate the possiblity of a force couple being exerted at the opposite axial ends of one or more cylinder blocks as the blocks are urged into abutment. Should a force couple as above mentioned be present it could tend to distort a cylinder block or move it out of axial alignment sufficiently to inhibit free sliding movement of the piston 1. For similar reasons the regions 101 of abutment between the blocks 20 to 22 and the regions of abutment of blocks 20 and 22 with members 27 and 28 are all in alignment parallel to the axis of the respective cylinder.

Although the fluid circuitry employed in the motor is irrelevant to an understanding of the present invention it will be apparent that several passages have been shown which extend between the cylinder for piston 1 and the cylinder for piston 2 and the motor may be of the type in which the pistons 1 and 2 mutually control the reciprocation of each other by appropriate control of fluid flow between a fluid input port 29 and a fluid exhaust port 30. An example of a fluid pressure operated motor of the aforementioned type and to which piston cylinder constructions in accordance with the present invention and as above described and illustrated may be applied is disclosed in our British Patent Specification No. 1,157,440.

Bearing in mind that one or more of the cylinder blocks in a particular assembly may be used to provide a housing for a sealing ring, for example between the cylinder block and the piston, provision may be made in the cylinder block or blocks having such a sealing ring for relieving fluid pressure which may otherwise be applied through leakage to the sealing ring. This feature is incorporated in the cylinder block 7 through which the piston rod 1d is slidable. The part of the cylinder defined by the block 7 opens towards a piston chamber 31 which, for example, may be intended to contain fluid under high pressure. As a consequence fluid may leak between the surface of the piston rod 'd and the cylinder part in block 7 to act on the seal 17 and such high pressure fluid may be detrimental to the seal. To alleviate pressure on the seal 17, the internal cylindrical wall of the block 7 is provided with an annular recess 32 which is in permanent communication by way of passage 33, external annular recess 34 on the block 7 and passage 35 in the housing 9 with the exhaust port 30. By this arrangement fluid which leaks from the chamber 31 may pass between the cylinder in block 7 and the cylindrical surface of rod 1b until it reaches the annular recess 32 and through which it can pass to exhaust so that fluid pressure is not applied directly to the seal 17. Fluid leakage from the chamber 31 should have negligible effect on the pressure conditions within that chamber; however, with hydraulic fluid this leakage may provide lubrication for movement of the piston through the cylinder block 7 and to facilitate such lubrication an axially spaced array of recesses 36 is provided in the internal cylindrical wall of the block 7 axially between the recess 32 and chamber 31 to form annular pockets of fluid which may act as hydrostatic bearings for the piston rod 1d.

What we claim is:

1. An assembly which comprises a piston slidable in a piston cylinder in which the piston cylinder is at least partly defined by at least two substantially annular piston cylinder blocks which are received axially within a substantially complementary cylindrical bore of a housing of the assembly, said cylinder blocks forming an axially extending array with adjacent end faces of adjacent cylinder blocks in substantially face-to-face abutment; retaining means at each axial end of the array of cylinder blocks and axially retaining said blocks in the bore of the housing; each retaining means comprising a retaining component on the housing, the retaining component of at least one retaining means being axially adjustable to apply pressure axially to the cylinder blocks in the array and therethrough to the retaining component at the other end of the array, and wherein each retaining means further comprises substantially complementary slidably engaging part spherical surfaces which are substantially coaxial with the bore and through which said axial pressure is applied between the retaining components and the cylinder blocks, at least one of the part spherical surfaces of each retaining means being carried by a member disposed axially between the retaining component and the cylinder block which are adjacent to that member, each said member being capable of radial displacement relative to the axis of the bore to accommodate for slight axial misalignment between the retaining components and the cylinder blocks and alleviate axially offset pressure which may otherwise be applied from the retaining components to the cylinder blocks.

2. An assembly as claimed in claim 1 in which each of said radially displaceable members is located in the bore of the housing.

* * * * *